(12) United States Patent
Cui et al.

(10) Patent No.: US 6,790,931 B2
(45) Date of Patent: Sep. 14, 2004

(54) METHOD FOR PRODUCING SULFONATED AROMATIC POLYMERS AND USE OF THE PROCESS PRODUCTS FOR PRODUCING MEMBRANES

(75) Inventors: Wei Cui, Blaustein (DE); Thomas Soczka-Guth, Schelklingen (DE); Georg Frank, Tübingen (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 10/148,776
(22) PCT Filed: Dec. 8, 2000
(86) PCT No.: PCT/EP00/12427
§ 371 (c)(1),
(2), (4) Date: Jan. 13, 2003
(87) PCT Pub. No.: WO01/42336
PCT Pub. Date: Jun. 14, 2001

(65) Prior Publication Data
US 2003/0171532 A1 Sep. 11, 2003

(30) Foreign Application Priority Data
Dec. 9, 1999 (DE) .......................................... 199 59 289

(51) Int. Cl.[7] .............................................. C08G 75/00
(52) U.S. Cl. ...................... 528/373; 528/391; 528/486; 528/487; 528/503
(58) Field of Search ................................. 528/373, 391, 528/486, 487, 503

(56) References Cited
U.S. PATENT DOCUMENTS
5,013,765 A * 5/1991 Sluma et al. ................. 521/27

* cited by examiner

Primary Examiner—Duc Truong
(74) Attorney, Agent, or Firm—Robert H. Hammer III, P.C.

(57) ABSTRACT

A novel non-aggressive sulfonating process for aromatic polymers is described.

Figure 3:
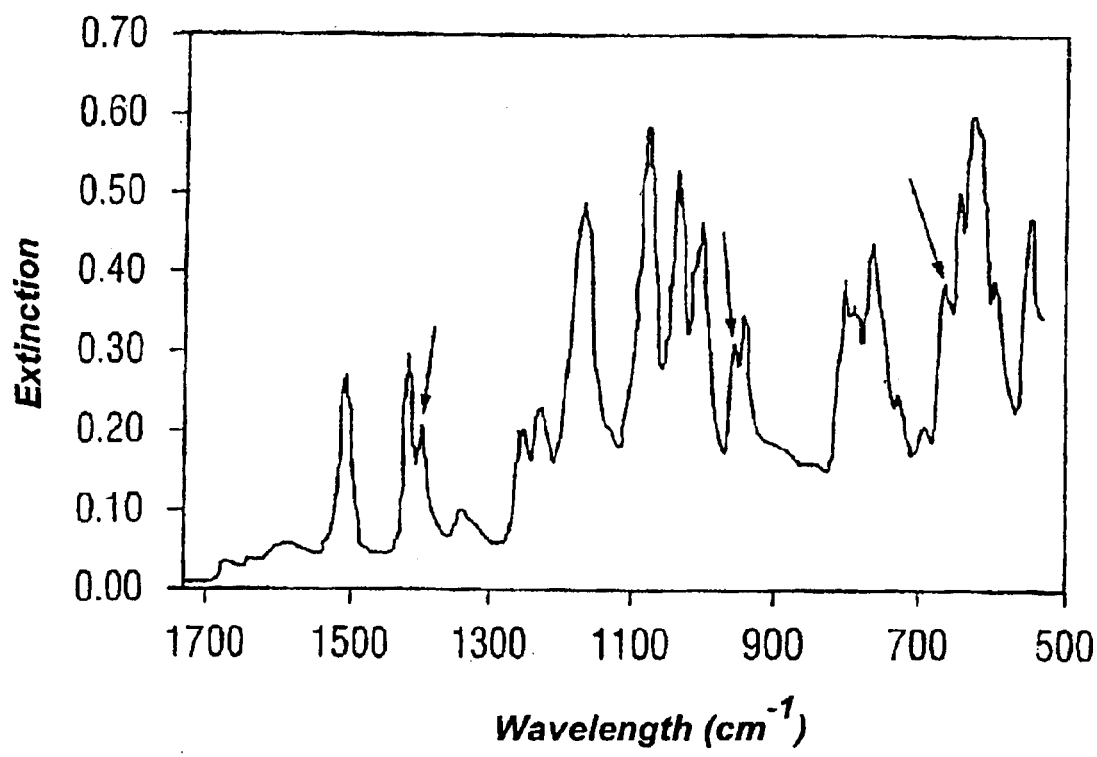

The process encompasses:
  a). dissolving the aromatic polymer in a substantially anhydrous acid selected from the group consisting of concentrated sulfuric acid, chlorosulfonic acid, and oleum,
  b) adding an organic solvent which is inert under the conditions of the reaction,
  c) adding a carboxylic anhydride,
  d) adding a sulfonating agent, and
  e) carrying out the sulfonation at a temperature below 25° C. and for a time sufficient to achieve the desired degree of sulfonation.

The resultant homogeneous products of the process may preferably be used to produce membranes, for example for fuel cell applications

15 Claims, 3 Drawing Sheets

Mechanism for activating the sulfonating agent

Fig. 1 Mechanism for activating the sulfonating agent
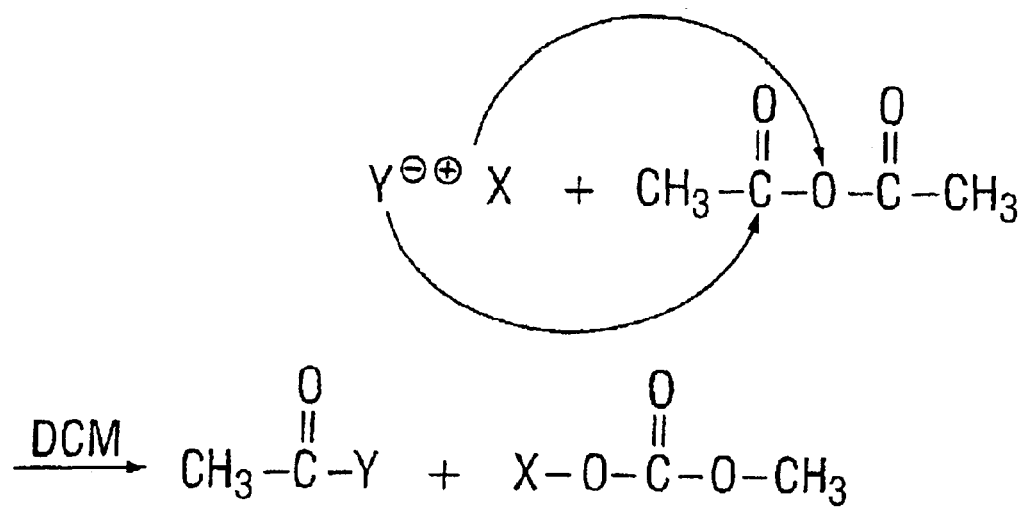
Fig. 2 Sulfonation of PES using a sulfonating agent
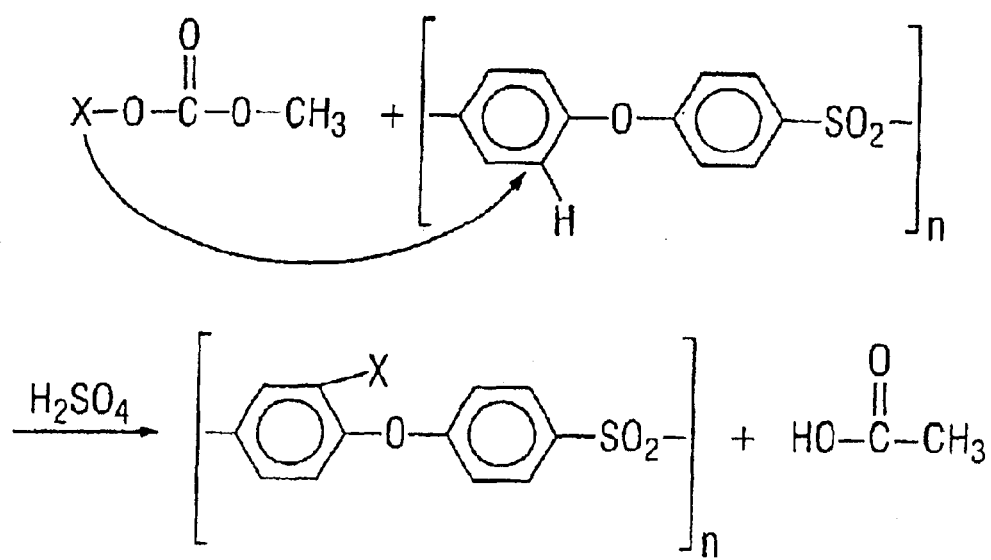

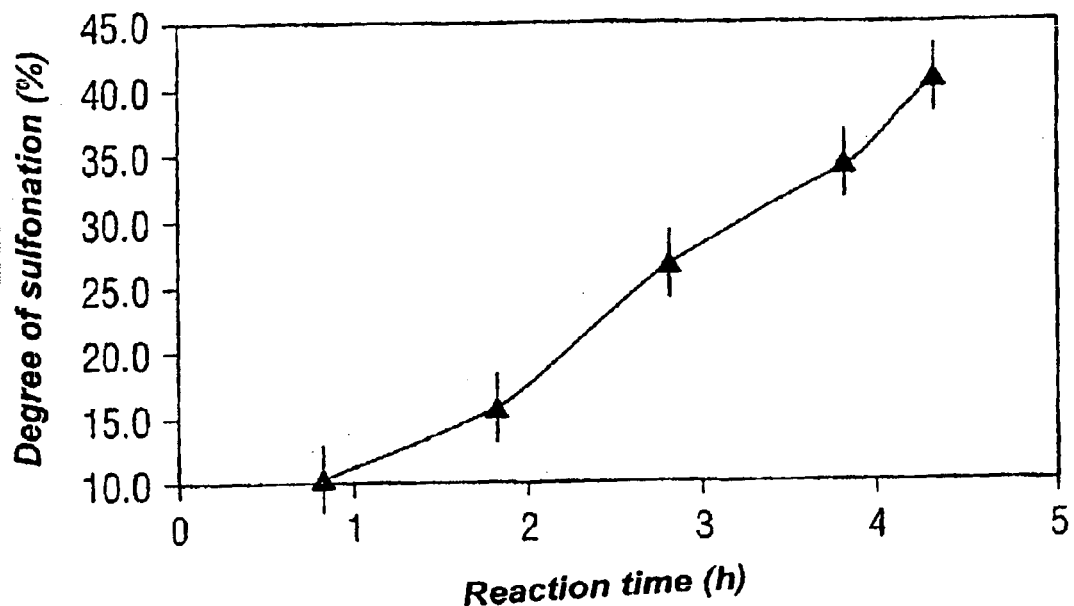
Fig. 5  Degree of sulfonation as a function of reaction time
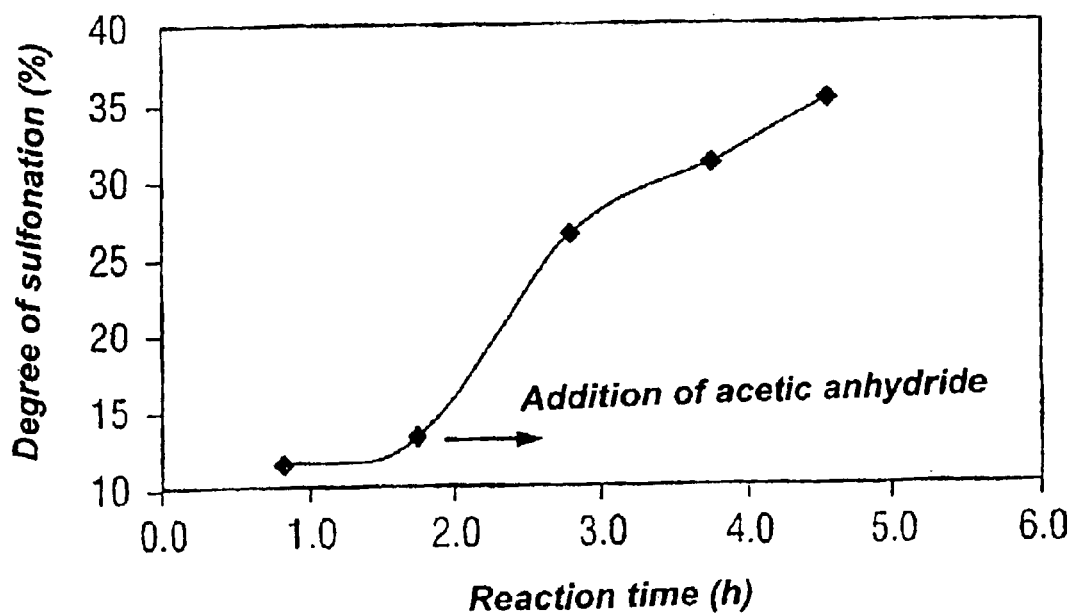
Fig. 6  Degree of sulfonation as a function of reaction time

METHOD FOR PRODUCING SULFONATED AROMATIC POLYMERS AND USE OF THE PROCESS PRODUCTS FOR PRODUCING MEMBRANES

The present invention relates to a process for preparing sulfonated aromatic polymers, in particular sulfonated aromatic polyether ketones and sulfonated aromatic polyether sulfones, and also to the use of the products of the process for membrane production.

Aromatic sulfonated polymers are used in many applications, for example in the form of membranes, these being used in fuel cells, high-performance capacitors, and dialysis devices.

Fuel cells are electrochemical energy converters which have particularly high efficiency. Among the various types of fuel cells, polymer electrolyte fuel cells have high power density and low weight to power ratio.

For further development of fuel cell technology, in particular for its use on a larger scale, the production costs of the materials used have to be reduced, but this must not lead to any need to accept performance which is inferior to that of the materials used to date.

Polyether sulfones (hereinafter also termed "PES") are commercially available products and have high resistance to heat, chemicals, and mechanical effects. A typical example of polyether sulfones is given in the figure below.

The sulfonation of PES is of great interest for producing polymers which can be used in separation processes using membrane methods.

The prior art has disclosed various sulfonation processes for PES, for example in EP-A-0,008,894; EP-A-0,112,724; U.S. Pat. No. 4,508,852; U.S. Pat. No. 3,709,841 and DE-A-3,814,760.

However, these previously disclosed sulfonation processes have many disadvantages. For example, the use of strong sulfonating agents, such as oleum or chlorosulfonic acid, at temperatures above 25° C. risks degrading polymer chains. To avoid polymer degradation, therefore, the reaction temperature would have to be kept low. This in turn usually leads to a low degree of sulfonation, and also to long reaction times. Sulfonation by previously disclosed processes in organic solvents has also been found to proceed heterogeneously. This generally gives a sulfonated product with inhomogeneous structure.

U.S. Pat. No. 4,508,852 describes other sulfonation processes for PES. In one of the processes, dichlorosulfonic acid is used as both solvent and sulfonating agent. The temperature during the reaction is initially set at room temperature for 2 h and then to 82° C. for 30 min. A second process uses 1,1,2,2-tetrachloroethane as solvent and chlorosulfonic acid as sulfonating agent. The sulfonation is carried out at 150° C. under a superatmospheric pressure generated by nitrogen. The third process suspends PES in 1,2-dichloroethane. The suspension becomes clear after addition of chlorosulfonic acid. However, the sulfonated PES precipitates during the course of the reaction. Sulfonation by the process therefore proceeds heterogeneously.

These three known processes likewise have many disadvantages. For example, it is impossible to avoid side-reactions and therefore by-products (chlorosulfonated products) by using chlorosulfonic acid. The process is moreover difficult to control, since the high reaction temperature permits only a relatively short reaction time. The sulfonated PES moreover has low viscosity, which may be attributable to polymer chain degradation.

EP-A-0,008,894 and other references (cf. LÜHui-Juan; SHEN Lian-Chun; WANG Cai-Xia; JIANG Da-Zhen; CHEMICAL JOURNAL of CHINESE UNIVERSITIES; No. 5 Vol. 19; 05.1998; pp. 833–835) state that no sulfonation of PES occurs in concentrated sulfuric acid. Sulfonation of PES in chlorosulfonic acid takes more than 20 h at room temperature. The resultant product is water-soluble. The sulfonation of PES can likewise be carried out in concentrated sulfuric acid by using oleum as sulfonating agent "overnight", the sulfonated PES being water-soluble. This may be attributable to the excessive degree of sulfonation and/or to polymer degradation. According to this prior art, controllable sulfonation is not possible using chlorosulfonic acid or oleum.

The same conclusion is found in EP-A-0,112,724. This prior art describes novel sulfonation processes.

The process describes suspends PES in dichloromethane and treats it with sulfonating agents, e.g. $SO_3$ or chlorosulfonic acid, for a period of 4 hours at a temperature of from 0 to 5° C.

U.S. Pat. No. 4,413,106 carries out the same sulfonation of PES using oleum. However, the sulfonation is carried out heterogeneously, and this may be the cause of structural inhomogeneity of the sulfonated PES.

DE-A-38 14 760 describes the sulfonation of PES in pure sulfuric acid using 65% strength oleum. The PES sulfonated within a short time (3 hours) and at a low temperature has a low degree of sulfonation (22%) and a reduced viscosity. Carrying out the reaction within a period of 22 hours at 25° C. gives a 39% degree of sulfonation of the PES. If the temperature is 40° C. the PES is degraded. However, no satisfactory result is obtained using the previously disclosed process when the temperature is below 5° C.

An article by LüHui-Juan et al. in Chemical Journal of Chinese Universities; No. 5 Vol. 19; 05.1998; pp. 833–835 describes the kinetics of sulfonation reactions. From this it is apparent that the sulfonation rate in concentrated sulfuric acid when using chlorosulfonic acid is very low within the first 10 hours. In contrast, the sulfonation rate in dichloromethane is very high even at the start of the reaction.

There continues to be a requirement for processes which can be carried out cost-effectively for the sulfonation of aromatic polymers. A particular issue is whether sulfonation can be carried out within a short period and at a low temperature, without polymer chain degradation. Sulfonation should also be controllable and the degree of sulfonation should be variable.

WO-A-96/29,359 and WO-A-96/29,360 describe polymer electrolytes made from sulfonated aromatic polyether ketones and the production of membranes from these materials.

EP-A-0 152 161 describes polyether ketones (hereinafter termed "PEK") mainly composed of the repeat units —O—Ar—CO—Ar— (Ar=divalent aromatic radical), and shaped structures produced from these.

J. Polym. Sci.: Vol. 23, 2205–2222, 1985 describes sulfonated, strictly alternating polyether ketones with the repeat unit —O—Ar—CO—Ar—. Here, the polyether ketone synthesis uses electrophilic attack rather than nucleophilic attack as described in EP-A-0 152 161. The polymers were sulfonated by sulfur trioxide using triethyl phosphate in dichloroethane. Another sulfonation method used in this reference is chlorosulfonation using chlorosulfonic acid. However, molecular weight degradation is again observed with this method, depending on the degree of sulfonation. Amidation of the acid chloride follows.

Starting from this prior art, the object on which the present invention is based is therefore to provide a simple and cost-effective process which sulforiates aromatic polymers and which minimizes degradation of the polymer during sulfonation, and which can be carried out in a homogeneous phase, and which maximizes product homogeneity.

The present invention provides a process for preparing sulfonated aromatic polymers, encompassing:

a) dissolving the aromatic polymer in a substantially anhydrous acid selected from the group consisting of concentrated sulfuric acid, chlorosulfonic acid, and oleum, b) adding an organic solvent which is inert under the conditions of the reaction, c) adding a carboxylic anhydride, d) adding a sulfonating agent, and e) carrying out the sulfonation at a temperature below 25° C. and for a time sufficient to achieve the desired degree of sulfonation.

The sequence of steps b) to d) of the process may be as desired. These steps may also be undertaken simultaneously.

The aromatic polymer used in step a) may be any polymer whose main polymer chain has sulfonatable aromatic groups and which is soluble in the solvents used in step a). Examples of these are aromatic polyamides, aromatic polyimides, aromatic polyether ketones (in the widest sense, i.e. polymers having ether bridges and ketone bridges in the main polymer chain), aromatic polycarbonates, aromatic polysulfones, polysulfoxides, or polysulfides, aromatic polyether sulfones, aromatic polyesters. Particular preference is given to aromatic polyether ketones, polyether ether ketone, polyether ether sulfone, and in particular polyether sulfones.

The substantially anhydrous acid used in step a) usually has water content of less than 3% by weight, preferably less than 2% by weight, in particular less than 1.5% by weight. The acids may be used individually or in combination.

The concentration of the dissolved aromatic polymer in the substantially anhydrous acid is usually from 0.01 to 30% by weight, preferably from 0.1 to 25% by weight, in particular from 1 to 20% by weight, based on the solution.

The inert organic solvent used in step b) may be a hydrocarbon, preferably halogenated, particularly preferably an aliphatic chlorinated and/or fluorinated hydrocarbon. This is usually liquid under the conditions of the reaction. The amount selected is such as to produce a homogeneous solution.

Examples of hydrocarbons are saturated aliphatic hydrocarbons liquid at 25°C., in particular branched or unbranched hydrocarbons having from 5 to 15 carbon atoms, for example pentane, hexane, heptane, octane, or decane, or ethylenically unsaturated aliphatic hydrocarbons, in particular having from 5 to 15 carbon atoms, for example hexene, octene, or decene.

Examples of halogenated hydrocarbons are chlorinated and/or fluorinated saturated aliphatic hydrocarbons liquid at 25° C., for example mono-, dl-, tri-, or tetrachloromethane, mono-, dl-, tri-, tetra-, penta-, or hexachloroethane, or the various chloro/fluoromethanes or chloro/fluoroethanes. Dichloromethane is particularly preferred.

The carboxylic anhydride used in step c) may be of any desired type. Use may be made not only of linear anhydrides but also of cyclic compounds.

Examples of these are anhydrides of aliphatic monocarboxylic acids, such as formic, acetic, propionic, butyric, and caproic acid, anhydrides of aliphatic or ethylenically unsaturated aliphatic dicarboxylic acids, such as malonic acid, succinic acid, or lactic acid, anhydrides of cycloaliphatic carboxylic acids, such as cyclohexanecarboxylic acid, anhydrides of aromatic mono- or dicarboxylic acids, such as benzoic acid, phthalic acid, isophthalic acid, or terephthalic acid. Besides these, use may also be made of anhydrides of different carboxylic acids. It is also possible to use trifluoroacetic anhydride $(CF_3CO)_2O$ or trichloroacetic anhydride $(CCl_3CO)_2O$. Acetic anhydride and trifluoroacetic anhydride are particularly preferred.

The sulfonating agent used in step d) may be any desired sulfonating agent as long as this is capable of sulfonating the aromatic main chain of the polymer under the conditions of the reaction. Examples of these are oleum, concentrated sulfuric acid, chlorosulfonic acid.

Preference is given to chlorosulfonic acid or oleum, in particular 20% strength oleum.

The sulfonation reaction is preferably carried out at temperatures below 10° C., in particular at temperatures below 5° C., particularly preferably at from 0 to 5° C. The lower limit may also be below 0° C. as long as the mixture remains liquid and can be stirred.

The usual period of time for which the sulfonation reaction is carried out is less than 15 hours. The sulfonation preferably takes less than 10 hours and very particularly preferably less than 6 hours.

The process of the invention is characterized by a low reaction temperature and short reaction time. The sulfonated aromatic polymers prepared by this process, in particular the polyether sulfones, have degrees of sulfonation which are particularly high and can be varied, and there is no significant polymer chain degradation.

The homogeneity of the sulfonation makes the products of the process particularly suitable for producing membranes for applications in which a high level of uniformity of properties is important. Examples of these are electrochemical applications, such as electrodialysis, or use in fuel cells, or use as a dielectric, for example in high-capacitance capacitors.

This invention also provides the use of the sulfonated aromatic polymers obtainable by the process of the invention, in particular of the sulfonated aromatic polyether sulfones, for producing homogeneous membranes or blend membranes.

FIGS. 1 and 2 illustrate the sulfonation process of the invention diagrammatically, using PES as example.

While there is no intention to be bound by descriptions of the mechanism, it is assumed that the anhydride activates the sulfonating agent.

The activated sulfonating agent then reacts with the aromatic polymer via electrophilic substitution as in the diagram below (see FIG. 2).

In the course of the process as shown in FIG. 2 an anhydrous acid is produced by dropwise addition of sulfonating agent, such as chlorosulfonic acid or oleum, into 95~97% strength sulfuric acid. PES then dissolves at 0° C. in the anhydrous acid. An inert organic solvent, such as dichloromethane ("DCM"), is then admixed. The sulfonating agent, such as chlorosulfonic acid and/or oleum, is then added. Finally, the activating agent acetic anhydride is added. The sulfonation may proceed at a temperature of from 0 to 10° C. and may be terminated by pouring the reaction mixture into water.

In another version of the process of the invention, an anhydrous acid is again first prepared by dropwise addition of sulfonating agent, such as chlorosulfonic acid or oleum, into 95–97% strength sulfuric acid. PES is then dissolved in the anhydrous acid at 0° C. Chlorosulfonic acid or oleum is then added as sulfonating agent. Acetic anhydride activating agent is then added in dichloromethane. The sulfonation may proceed at a temperature of from 0 to 10° C. and may be terminated by pouring the reaction mixture into water.

The amount of chlorosulfonic acid or oleum used during preparation of the anhydrous acid is related to the water content in the sulfuric acid. The amount used of the sulfonating agent, and also of the activating agent ("quasi-catalyst") is related to the targeted degree of sulfonation. The reaction time should accordingly be limited to a period of up to 6 hours.

The aromatic polyether sulfones sulfonated by the process of the invention were studied with the aid of FTIR, NMR, titration, GPC, and elemental analysis, and also DSC. Surprisingly, this showed that the processes permit controllable sulfonation of PES at low temperature and within a short reaction time.

Membranes were also produced from sulfonated PES, or blend membranes from sulfonated PES and unmodified PES; from sulfonated PES and aminated PES, and also from sulfonated PES and polybenzimidazole, PBI. To produce the membrane, N,N-dimethylacetamide (DMAC) or N-methylpyrrolidone (NMP) was used as solvent, and a polymer solution was prepared by dissolving sulfonated PES, and also other blend components, in solvent. A doctor was used to spread a film of the polymer solution on a substrate, and the solution was evaporated to produce the membrane. The examples below illustrate, but do not limit, the invention.

EXAMPLE 1

100 ml of 95–97% strength sulfuric acid formed an initial charge and were treated with 35 ml of chlorosulfonic acid at 0° C. 20 g of PES (grade E6020; BASF AG) were then dissolved in the mixture at 0° C. 50 ml of dichloromethane were then admixed. The solution was cooled to 0° C., with stirring. Within 30 minutes, 4 ml of chlorosulfonic acid were added dropwise to the polymer solution. 8 ml of acetic anhydride were then added. The sulfonation then proceeded for 3.3 hours at from 5 to 10° C.

Table 1 lists the GPC data for unmodified PES and sulfonated PES.

TABLE 1

| | GPC data | |
|---|---|---|
| | Sulfonated PES | Unmodified PES |
| Mn | 1.512E+4 g/mol | 4.554E+3 g/mol |
| Mw | 4.033E+4 g/mol | 4.152E+4 g/mol |
| Mz | 6.992E+4 g/mol | 7.286E+4 g/mol |
| Mv | 3.675E+4 g/mol | 3.744E+4 g/mol |
| D* | 2.668E+0 | 9.117E+0 |

Measurement conditions: DMSO; 4.3 g/l; PS acid; 60° C.; 1.0 ml/min; D*=polydispersity Table 1 shows that the average molar mass of sulfonated PES is higher than that of the unmodified PES, this being attributable to the sulfone groups in the underlying polymer. Mw, Mz, and Mv are comparable for sulfonated PES and unmodified PES.

Table 2 lists the calculated and measured values for elemental analysis on sulfonated PES.

TABLE 2

Results of elemental analysis and titration

| Element | Calculated 1* (%) | Calculated 2** (%) | Found*** |
|---|---|---|---|
| C% | 55.8 | 54.5 | 52.5 |
| H% | 2.8 | 2.8 | 2.5 |
| O% | 24.8 | 25.6 | 27.7 |
| S% | 16.5 | 17.1 | 16.5 |
| Cl% | | | <0.04 |

*Values calculated from sulfur content, determined with the aid of elemental analysis.
**Values calculated from sulfur content, determined with the aid of titration.
***Values determined with the aid of elemental analysis.

The results from GPC and elemental analysis show that no polymer chain degradation takes place during sulfonation using the abovementioned processes.

FIG. 3 shows the FTIR spectrum of sulfonated PES.

As described in the references [Lü Hui-Juan et al. in Chemical Journal of Chinese Universities, No. 5 Vol. 19, 051/998. pp. 833–835; In-Cheol Kim et al. in Membrane Journal; Vol. 8. No. 4, 12/1998, pp. 210–219; R. Nolte et al. in Journal of Membrane Science (1993) 211–220], the new absorption bands at 1028 $cm^{-1}$, 737 $cm^{-1}$ and 1465 $cm^{-1}$ derive from the $SO_3H$ groups on the aromatic rings relative to ortho-ether bridges.

Figure 4:
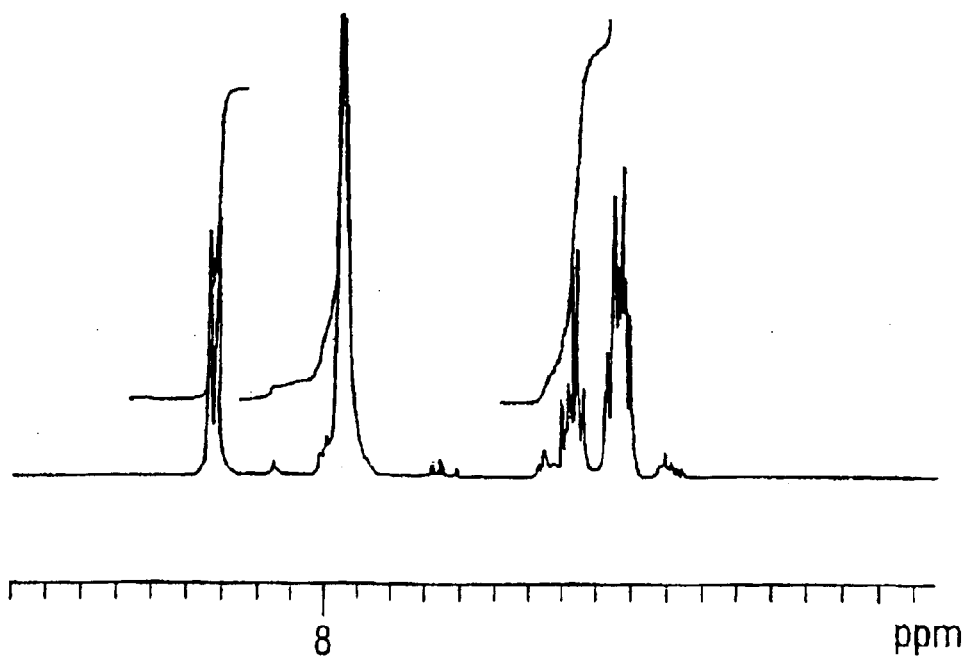

FIG. 4 shows the $^1H$-NMR spectrum of sulfonated PES.

As described in the abovementioned references, the chemical shift at 8.31 ppm arises from sulfonation of PES.

The degree of sulfonation or ion exchange capacity ("IEC") was determined as a function of reaction time by potentiometric titration.

From FIG. 5, the degree of sulfonation of the sulfonated PES is seen to be a function of reaction time, a degree of sulfonation of 41.2% (IEC=1.55 meq/g) being achieved within a period of 5 hours.

The reaction time is considerably shortened over the process disclosed in DE-A-38 14 760 (see Examples 1–3), and the reaction temperature is lower, while the degree of sulfonation of the sulfonated PES is increased.

EXAMPLE 2

100 ml of 95–97% strength sulfuric acid formed an initial charge at room temperature and were treated with 110 ml of 20% strength oleum. The temperature of the solution was then lowered to 0° C. 40 g of PES (grade E7020; BASF AG) were then dissolved in the mixture at 0° C. 100 ml of dichloromethane were then admixed. 20 ml of 20% strength oleum were added to the polymer solution dropwise within a period of 30 min. Finally, 8 ml of acetic anhydride were added. The sulfonation then proceeded for 2 hours at from 0 to 10° C. The total time of the process from dissolving the PES to the end of sulfonation was about 5 hours.

From FIG. 6 it is seen that acceleration of the sulfonation occurred only after addition of acetic anhydride.

Analogous characterization results to those in Example 1 were obtained from FTIR and NMR. The degree of sulfonation of the product determined by titration was 34.3% (IEC=1.32). Compared with the previously disclosed process from DE-A-38 14 760 (see Example 3) the reaction time was similar and the reaction temperature lower (25° C. in the DE-A) to achieve a comparable degree of sulfonation. At similar reaction time and temperature the degree of sulfonation is considerably higher than that in DE-A-38 14 760 (cf. Examples 1 and 2).

EXAMPLE 3

200 ml of 95–97% strength sulfuric acid formed an initial charge at 10° C. and were treated with 220 ml of 20% strength oleum. 80 g of PES (grade E7020; BASF AG) were then dissolved in the mixture at 10° C. 16 ml of chlorosulfonic acid were added dropwise to the polymer solution within a period of 30 min. Finally, 18 ml of acetic anhydride were added in 100 ml of dichloromethane. The sulfonation then proceeded for 4 hours at 10° C.

The titration result showed the degree of sulfonation of the product to be 96% (IEC=3.1 meq/g). The product was water-soluble.

EXAMPLE 4

200 ml of 95–97% strength sulfuric acid formed an initial charge at 10° C. and were treated with 129 ml of 20% strength oleum. 70 g of PES (grade E7020; BASF AG) were then dissolved in the mixture at 10° C. 14 ml of chlorosulfonic acid were added dropwise to the polymer solution within a period of 30 min. Finally, 15 ml of acetic anhydride were added in 100 ml of dichloromethane. The sulfonation then proceeded for 2 hours at 10° C.

The titration result showed the degree of sulfonation of the product to be 13% (IEC=0.54 meq/g).

EXAMPLE 5 (MEMBRANE PRODUCTION)

Tables 3 and 4 give an overview of the membranes produced.

TABLE 3

Membrane production

| Solvent | NMP |
|---|---|
| Polymer components | Sulfonated PES or sulfonated PES/PES |
| Polymer concentration | 20–25% |
| Evaporation temperature | 90–120° C. |
| Residence time in oven | 20 h |
| Post-treatment of membranes | 1 N $H_2SO_4$, at 40° C. demineralized water at 40° C. |

TABLE 4

Data for membranes produced

| Membrane No. | Materials | IEC (meq/g) | Swe (% by weight)* | Cond. (mS/cm)* | Modulus of elasticity (N/mm$^2$)* | Elongation at break (%)* |
|---|---|---|---|---|---|---|
| TE-46 | Sulfonated PES | 1.35 | 34 | 106.4 | 138.3 | 150.5 |
| TE-47 | Sulfonated PES and 10% PES | 1.3 | 44.6 | 154.4 | 183.9 | 111.9 |

Measurement carried out in demineralized water at 80° C. Sw indicates membrane swelling. Cond indicates membrane conductivity.

What is claimed is:

1. A process for preparing sulfonated aromatic polymers, encompassing:
   (a) dissolving the aromatic polymer in a substantially anhydrous acid selected from the group consisting of concentrated sulfuric acid, chlorosulfonic acid, and oleum,
   (b) adding an organic solvent which is inert under the conditions of the reaction,
   (c) adding a carboxylic anhydride,
   (d) adding a sulfonating agent, and
   (e) carrying out the sulfonation at a temperature below 25° C. and for a time sufficient to achieve the desired degree of sulfonation.

2. The process as claimed in claim 1, wherein the organic solvent inert under the conditions of the reaction is selected from the group consisting of aliphatic hydrocarbons liquid at 25° C., in particular branched or unbranched hydrocarbons having from 5 to 15 carbon atoms, and chlorinated and/or fluorinated aliphatic hydrocarbons liquid at 25° C., in particular dichloromethane.

3. The process as claimed in claim 1, wherein the carboxylic anhydride is selected from the group consisting of anhydrides of aliphatic monocarboxylic acids, anhydrides of aliphatic or ethylenically unsaturated aliphatic dicarboxylic acids, anhydrides of cycloaliphatic carboxylic acids, and anhydrides of aromatic mono- or dicarboxylic acids, in particular acetic anhydride and triflouroacetic anhydride.

4. The process as claimed in claim 1, wherein the sulfonating agent is selected from the group consisting of oleum and chlorosulfonic acid.

5. The process as claimed in claim 1, wherein the temperature during the entire reaction time, and in particular during the sulfonation, is set to be below 10° C., in particular below 5° C.

6. The process as claimed in claim 1, wherein the reaction takes less than 6 hours.

7. The process as claimed in claim 1, wherein the aromatic polymer is dissolved in anhydrous acid and the concentration of this polymer solution is in the range from 0.01 to 30% by weight, based on the solution.

8. The process as claimed in claim 1, wherein dichloromethane is used as solvent and acetic anhydride or trifluoroacetic anhydride as anhydride.

9. The process as claimed in claim 1, wherein at the end of the sulfonation the sulfonated aromatic polymer is stirred into iced water at a temperature below 5° C.

10. The process as claimed in claim 1, wherein 20% strength oleum and/or chlorosulfonic acid with purity above 97% are used as sulfonating agent.

11. The process as claimed in claim 1, wherein polyether sulfones, such as PES or PEES, or polyketones, such as PEK, PEEK, PEKEK, PEKK, or PEEKK, are used as aromatic polymer.

12. Homogeneous membranes or blend membranes made from two or more components, where said components are selected from the group consisting of: sulfonated polyether sulfone, unmodified polyether sulfone, sulfonated polyether sulfone, aminated polyether sulfone, sulfonated polyether sulfone, polybenzimidazole and combinations thereof, where sulfonated aromatic polymers are made by a process of:
   (a) dissolving the aromatic polymer in a substantially anhydrous acid selected from the group consisting of concentrated sulfuric acid, chlorosulfonic acid, and oleum,
   (b) adding an organic solvent which is inert under the conditions of the reaction,
   (c) adding a carboxylic anhydride,
   (d) adding a sulfonating agent, and
   (e) carrying out the sulfonation at a temperature below 25° C. and for a time sufficient to achieve the desired degree of sulfonation.

13. A fuel cell which comprises a membrane, where said membrane is made by the process of claim 12.

14. A multilayer membrane comprising at least two membranes where at least one of said membranes is fabricated from a sulfonated aromatic polymer, where said sulfonated aromatic polymer is produced by the steps of:
   (a) dissolving the aromatic polymer in a substantially anhydrous acid selected from the group consisting of concentrated sulfuric acid, chlorosulfonic acid, and oleum,
   (b) adding an organic solvent which is inert under the conditions of the reaction,
   (c) adding a carboxylic anhydride,
   (d) adding a sulfonating agent, and
   (e) carrying out the sulfonation at a temperature below 25° C. and for a time sufficient to achieve the desired degree of sulfonation.

15. An electrical membrane process comprising the step of: providing a membrane made by the process of claim 12, where said electrical membrane process is used for electrodialysis.

* * * * *